(12) United States Patent
Daily, Jr.

(10) Patent No.: US 10,988,263 B2
(45) Date of Patent: Apr. 27, 2021

(54) VTOL AIRCRAFT WITH JET ENGINE COUPLED TO DOWNWARD THRUST NOZZLES

(71) Applicant: Thomas Francis Daily, Jr., St. Louis, MO (US)

(72) Inventor: Thomas Francis Daily, Jr., St. Louis, MO (US)

( * ) Notice: Subject to any disclaimer, the term of this patent is extended or adjusted under 35 U.S.C. 154(b) by 343 days.

(21) Appl. No.: 15/889,865

(22) Filed: Feb. 6, 2018

(65) Prior Publication Data

US 2018/0170561 A1    Jun. 21, 2018

Related U.S. Application Data

(60) Provisional application No. 62/431,612, filed on Dec. 8, 2016.

(51) Int. Cl.
| | | |
|---|---|---|
| *B64C 39/00* | (2006.01) | |
| *B64D 27/16* | (2006.01) | |
| *B64D 33/02* | (2006.01) | |
| *B64D 29/00* | (2006.01) | |
| *B64C 29/00* | (2006.01) | |
| *B64C 29/04* | (2006.01) | |
| *B64C 25/54* | (2006.01) | |

(52) U.S. Cl.
CPC ............ *B64D 27/16* (2013.01); *B64C 29/005* (2013.01); *B64C 29/0016* (2013.01); *B64C 29/04* (2013.01); *B64C 39/00* (2013.01); *B64D 29/00* (2013.01); *B64D 33/02* (2013.01); *B64C 25/54* (2013.01)

(58) Field of Classification Search
CPC ......... B64C 15/00; B64C 15/02; B64C 25/54; B64C 25/58; B64C 29/00; B64C 29/0016; B64C 29/0041; B64C 29/005; B64C 29/0058; B64C 29/0091; B64C 29/04; B64C 39/00; B64C 39/001
See application file for complete search history.

(56) References Cited

U.S. PATENT DOCUMENTS

| | | | | |
|---|---|---|---|---|
| 2,014,051 A | * | 9/1935 | Nishi ................... | B64C 29/0016 244/23 C |
| 2,966,318 A | * | 12/1960 | Chodan ............... | B64C 29/0016 244/23 C |
| 2,978,206 A | * | 4/1961 | Johnson .............. | B64C 29/0016 244/23 C |
| 2,990,137 A | * | 6/1961 | Willis ................. | B64C 29/0016 244/12.2 |
| 3,053,483 A | * | 9/1962 | Stahmer ............... | B64C 23/005 244/29 |

(Continued)

FOREIGN PATENT DOCUMENTS

FR         1478405 A   *  4/1967   ......... B64C 29/0058

*Primary Examiner* — Richard R. Green
*Assistant Examiner* — Michael A. Fabula
(74) *Attorney, Agent, or Firm* — Brett A. Schenck

(57) ABSTRACT

An aircraft including an engine compartment and an engine provided in the engine compartment. The aircraft further includes a ductwork housing positioned above the engine. The ductwork housing includes at least one duct. The at least one duct has an outlet port that faces downwardly. Operation of the engine causes air to flow through the duct and exit the outlet port. The outlet port is configured to direct the air flow downwardly to provide lift for the aircraft.

16 Claims, 8 Drawing Sheets

(56) References Cited

U.S. PATENT DOCUMENTS

| | | | | |
|---|---|---|---|---|
| 3,072,366 A * | 1/1963 | Freeland | ............... | B64C 29/00 244/23 C |
| 3,104,853 A * | 9/1963 | Klein | ............... | B64C 29/00 244/12.2 |
| 3,106,370 A * | 10/1963 | Sudrow | ............... | B64C 29/0016 244/17.19 |
| 3,127,131 A * | 3/1964 | Sudrow | ............... | B64C 29/0016 244/50 |
| 3,863,869 A * | 2/1975 | Bachman | ............... | B64C 29/04 244/23 D |
| 4,433,819 A * | 2/1984 | Carrington | ............... | B64C 29/0008 244/12.2 |
| 4,457,476 A * | 7/1984 | Andresevitz | ............... | B64C 29/00 244/23 C |
| 4,593,870 A * | 6/1986 | Cronkhite | ............... | B64C 1/062 188/375 |
| 5,653,404 A * | 8/1997 | Ploshkin | ............... | B63G 8/00 244/12.2 |
| 6,179,247 B1 * | 1/2001 | Milde, Jr. | ............... | B64C 29/00 244/23 A |
| 6,382,560 B1 * | 5/2002 | Ow | ............... | B64C 27/20 244/12.2 |
| 8,360,356 B2 * | 1/2013 | Moore | ............... | B64C 39/026 244/4 A |
| 2007/0022757 A1 * | 2/2007 | Zack | ............... | F02K 1/825 60/772 |
| 2014/0217231 A1 * | 8/2014 | Pantalone, III | ............... | B64C 27/14 244/17.21 |
| 2014/0314563 A1 * | 10/2014 | Mayrides | ............... | B64C 27/10 416/1 |
| 2016/0207624 A1 * | 7/2016 | Hymer | ............... | B64C 29/005 |

* cited by examiner

VTOL AIRCRAFT WITH JET ENGINE COUPLED TO DOWNWARD THRUST NOZZLES

FIELD

This application relates to an aircraft.

BACKGROUND

Helicopters are a type of rotorcraft in which lift and thrust are supplied by rotors. This allows the helicopter to take off and land vertically, to hover, and to fly forward, backward, and laterally. These attributes allow helicopters to be used in congested or isolated areas where fixed-wing aircraft cannot perform. Helicopters often cannot get close to brush, trees, and down power lines, since the trees may hit the spinning blades and damage them. The blade damage may be so severe that the helicopter crashes. Helicopters also require exterior moving parts, which are subject to damage. There are quadcopters that have shroud or circular metal tubing, to help protect blades from bumping into things and causing crash.

Helicopter and other aircraft may improvements

SUMMARY

In one aspect of the present invention, an aircraft is provided. The aircraft includes an engine compartment and an engine provided in the engine compartment. The aircraft further includes a ductwork housing positioned above the engine. The ductwork housing includes at least one duct. The at least one duct has an outlet port that faces downwardly. Operation of the engine causes air to flow through the duct and exit the outlet port. The outlet port is configured to direct the air flow downwardly to provide lift for the aircraft.

Other aspects of the disclosed invention will become apparent from the following detailed description, the accompanying drawings and the appended claims.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
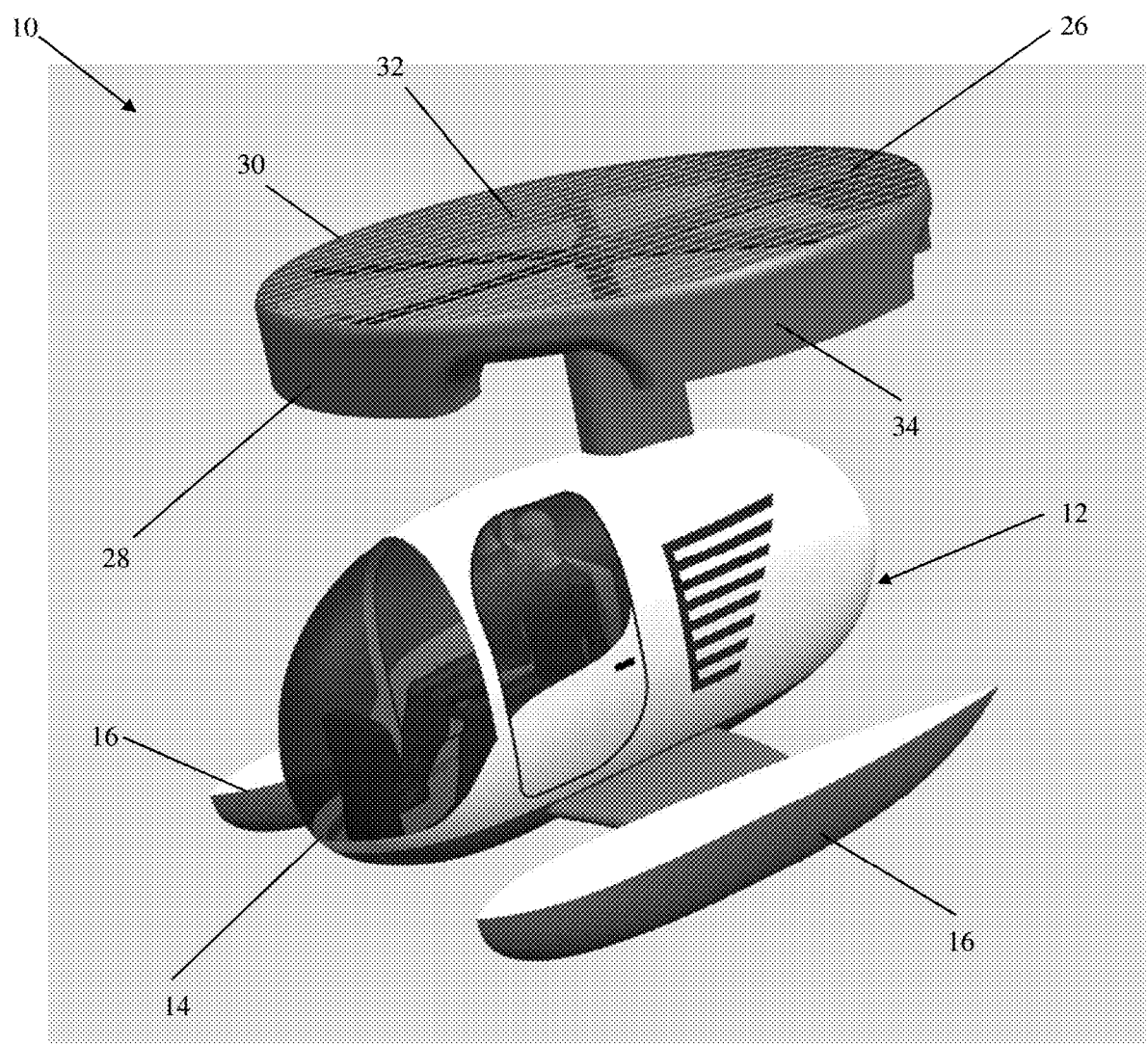
FIG. 1 is a top, front and right perspective view of the aircraft according to an embodiment of the invention.

Throughout the present description, the terms "upper", "lower", "top", "bottom", "left", "right", "front", "forward", "rear", and "rearward" shall define directions or orientations with respect to the flying watercraft as illustrated in FIG. 1. It will be understood that the spatially relative terms "upper", "lower", "top", "bottom", "left", "right", "front", "forward", "rear", and "rearward" are intended to encompass different orientations of the flying watercraft in use or operation in addition to the orientation depicted in the figures. For example, if the flying watercraft in the figures is turned over, elements described as "upper" elements or features would then be "lower" elements or features.

Figure 5:
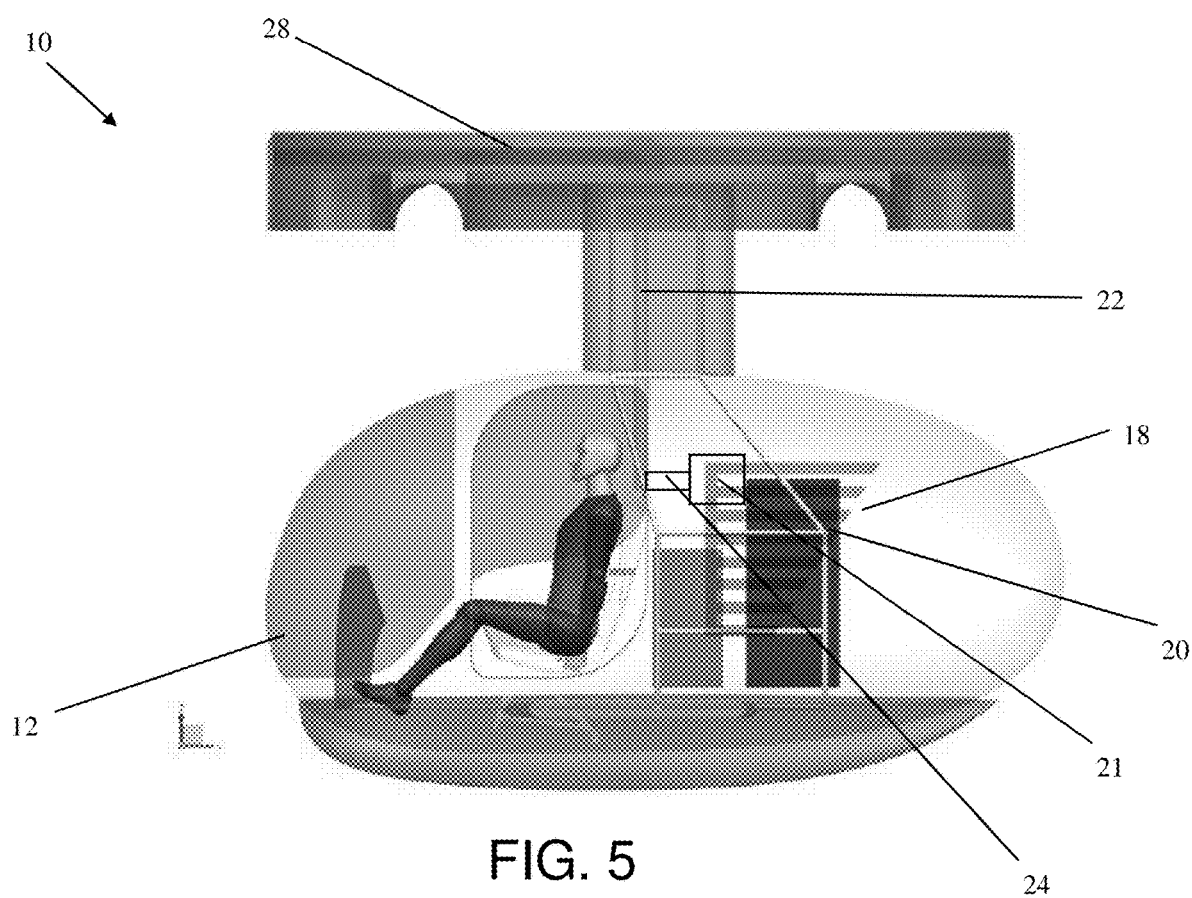
FIG. 5 is a right side view of the aircraft of FIG. 1 and showing components inside the fuselage.

Referring to FIG. 1, an aircraft 10 is shown. The aircraft may also be flying watercraft. The flying watercraft may be a helicopter. The aircraft 10 comprises a fuselage 12, which includes a cockpit 14. The cockpit 14 may include a cabin for accommodating two persons. Two pontoons 16 are attached to the fuselage 12 on opposite sides of the fuselage 12. The pontoons 16 enable the aircraft 10 to land on water. As illustrated in FIG. 5, the aircraft 10 also comprises an engine compartment 18 that is positioned rearwardly from or behind the two person cabin. An engine 20 or more than one engine may be provided in the engine compartment 18.

Figure 2:
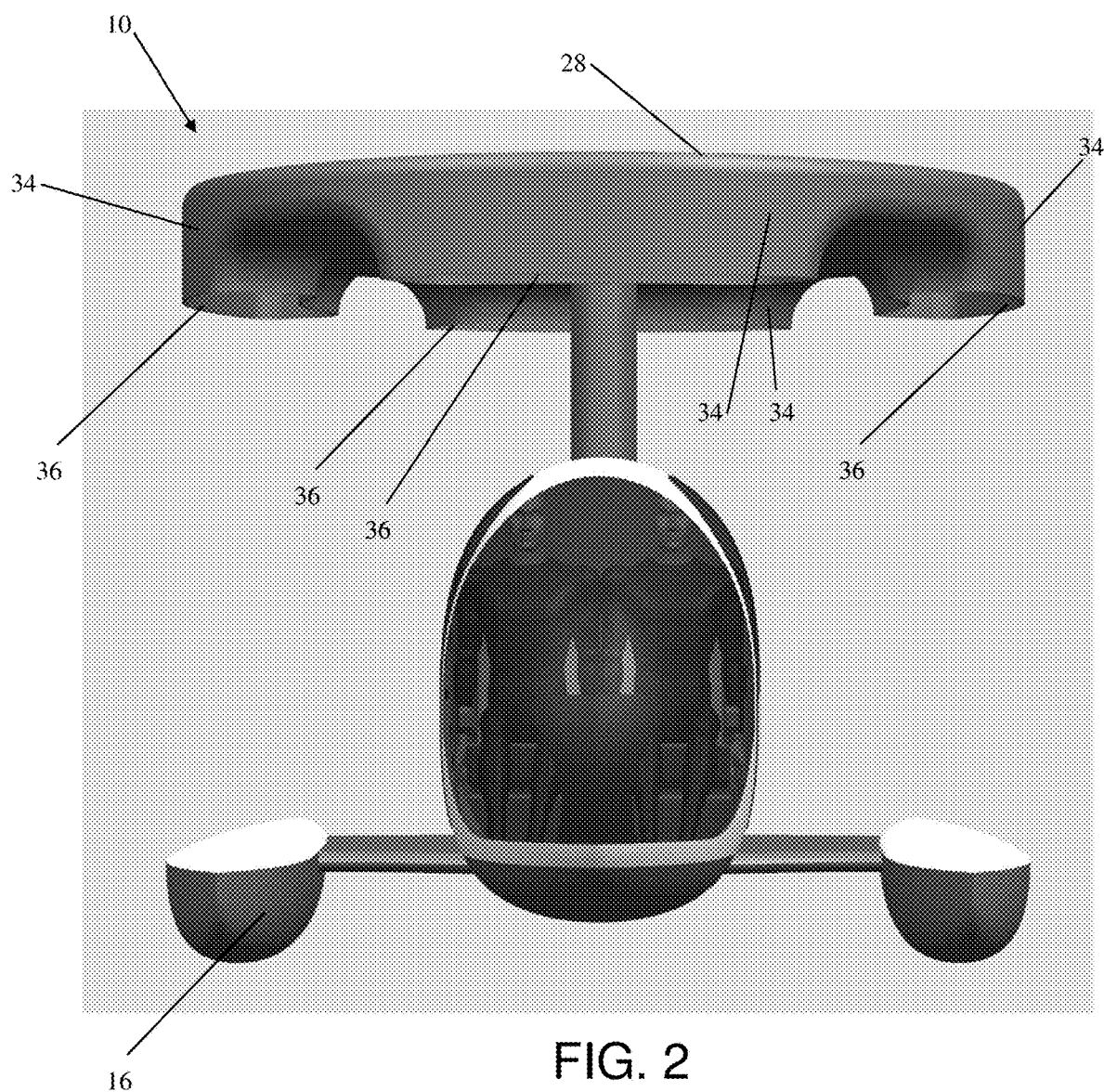
FIG. 2 is a front perspective view of the aircraft of FIG. 1.
Figure 3:
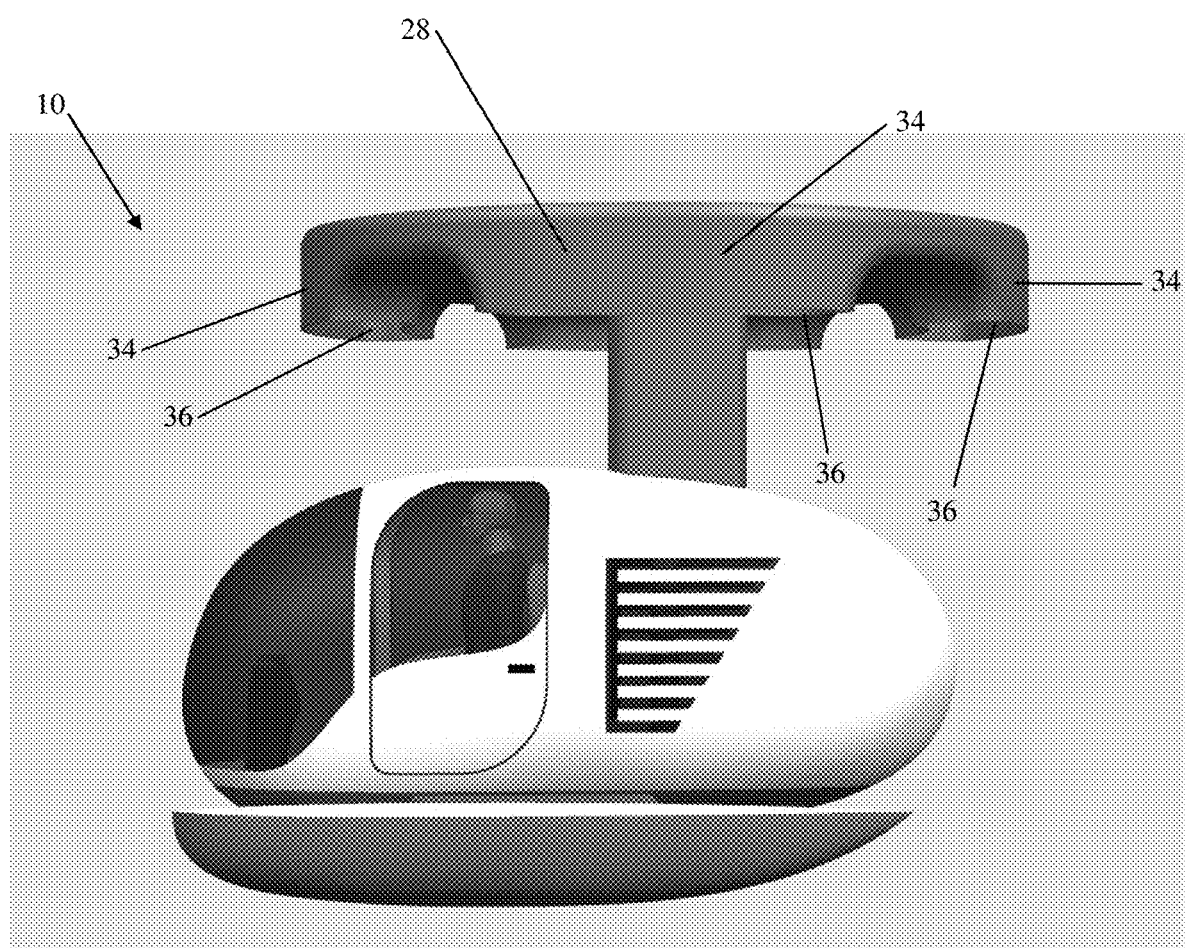
FIG. 3 is a right side perspective view of the aircraft of FIG. 1.
Figure 4:
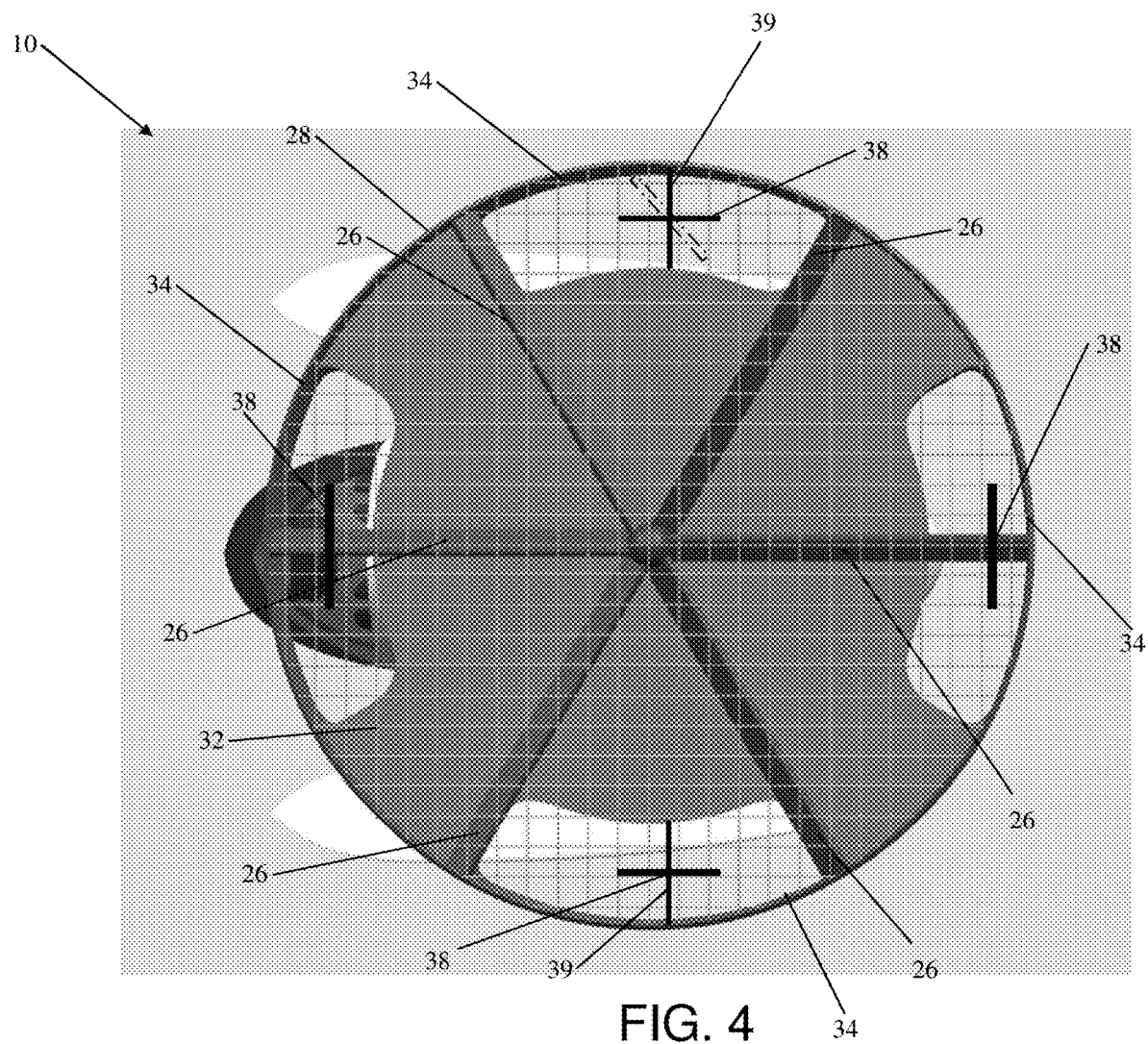
FIG. 4 is top view of the aircraft of FIG. 1.

A mast 22 is operatively coupled to a drive shaft 24, which is coupled to a transmission or gear box 21, which in turn is connected to the engine 20. Six turbo fan blades 26 (FIGS. 1 and 4) are operatively connected to the mast 22. The turbofan blades 26 are enclosed by a ductwork housing 28. The housing 28 is cylindrical in shape and has a top portion 30 that comprises a screen mesh 32 (FIGS. 1 and 4). The screen mesh 32 protects the turbofan blades 26 preventing foreign objects from entering into the housing 28 and hitting the turbofan blades 26. The housing 28 further comprises ducts 34 formed on the peripheral end of the housing 28. As illustrated in FIGS. 2 and 3, four outlet ports 36 are provided in their respective ducts 34 and are equally spaced circumferentially around the peripheral end of the housing 28. The outlet ports 36 face in the downward direction so that air flowing through them is directed downward.

As seen in FIG. 4, a steering vane or flap 38 is provided inside the respective duct 34 at each outlet port 36 and is pivotally mounted by a suitable mechanical linkage to a cross brace 39. The cross brace 39 is mounted to the housing 28 and extends across the respective duct 34. The mechanical linkage may be operatively connected to a steering control component that is controlled by the pilot. Steering is achieved by pivoting the steering vanes 38 at selective positions to change the amount and direction of the flow of air through the outlet ports 36. This provides a four point or port propulsion system in each outlet port 36. For example, the phantom lines shown in FIG. 4 indicate a steering vane 38 that is pivoted to another position to turn the aircraft. The aircraft 10 may weigh under 1400 lbs and can land on water. Each turbofan blade 26 has a diameter of 10.5 feet. By making outlet port 36 openings larger and/or the turbofan blade diameter larger will increase efficiency.

In alternative arrangements, there may be four, six, or eight separate engines provided at the locations of the outlet ports. The engines can be spaced out in circular or rectangular pattern around the housing. The housing may be in other suitable shapes such as a rectangular shape to enable the engines to be spaced in a rectangular pattern around the housing. One or more engines may be Rotax 582 engines. For example, the aircraft 10 may comprise three Rotax 582 engines.

Figure 6:
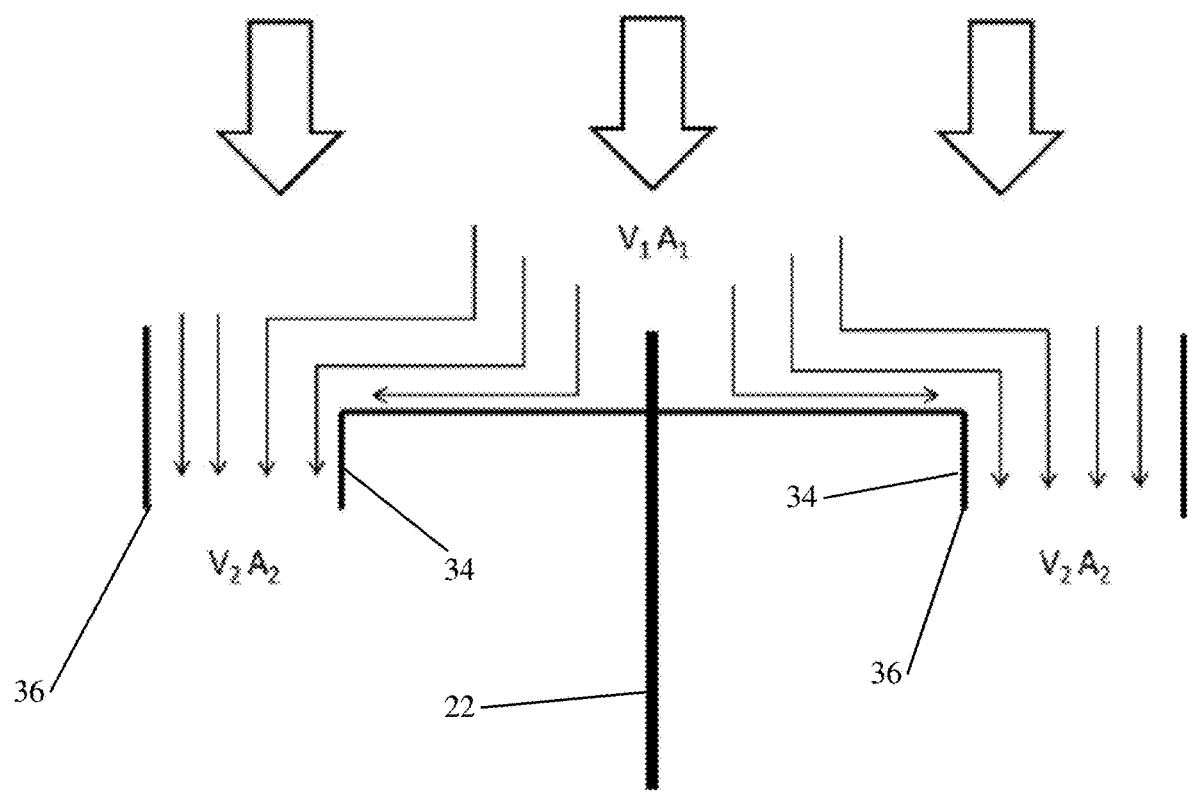
FIG. 6 is a schematic view of a portion of the aircraft of FIG. 1 illustrating the air flow in the ductwork housing.

In operation, the engine 20 or engines (such as the three Rotax 582 engines) are turned on to drive the drive shaft 24 or drive shafts, which in turn causes the mast 22 to rotate. Rotation of the mast 22 rotates the turbofan blades 26. As illustrated in FIG. 6, the turbofan blades 26 force air through ducts 34 and then out of the four outlet ports 36. The air exiting the outlet ports 36 is directed down to create the downdraft that provides lift to the aircraft. The steering vanes 38 direct the air through the outlet ports 36 at selected directions to steer the aircraft. The outlet port openings may be larger and/or the turbofan blade diameter may be larger to increase efficiency.

The aircraft 10 of the present invention has no exterior moving parts needed for steering in flight. This allows the aircraft 10 to get close to brush and trees, unlike a helicopter with a tail rotor and main blades exposed. By having the main lift blades enclosed and forcing air through the four ports and steering vanes to enable directional steering of the helicopter, there is no need for a tail rotor to perform the steering of the helicopter.

Figure 7:
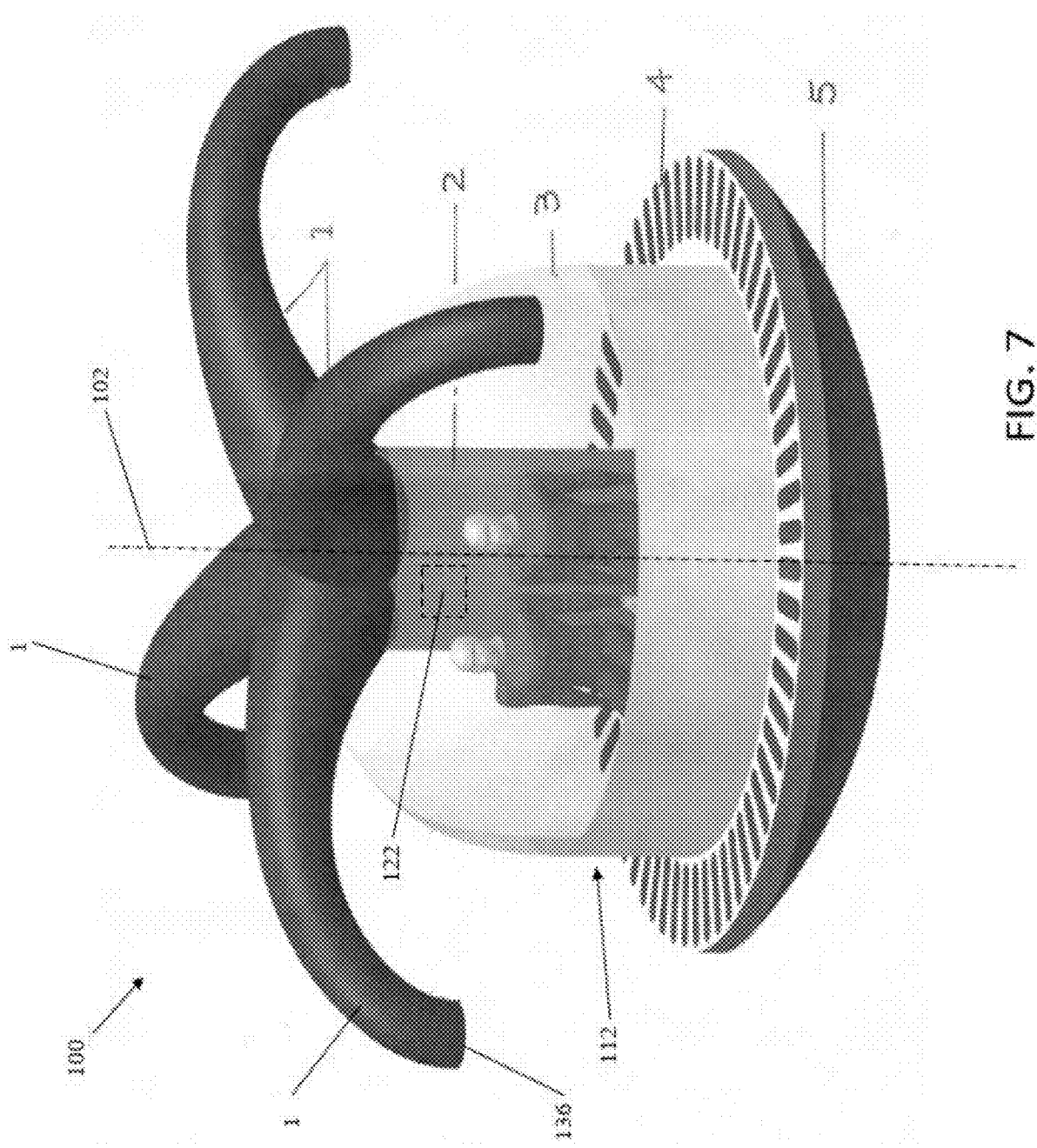
FIG. 7 is a front perspective view of an aircraft according to another embodiment of the present invention.
Figure 8:
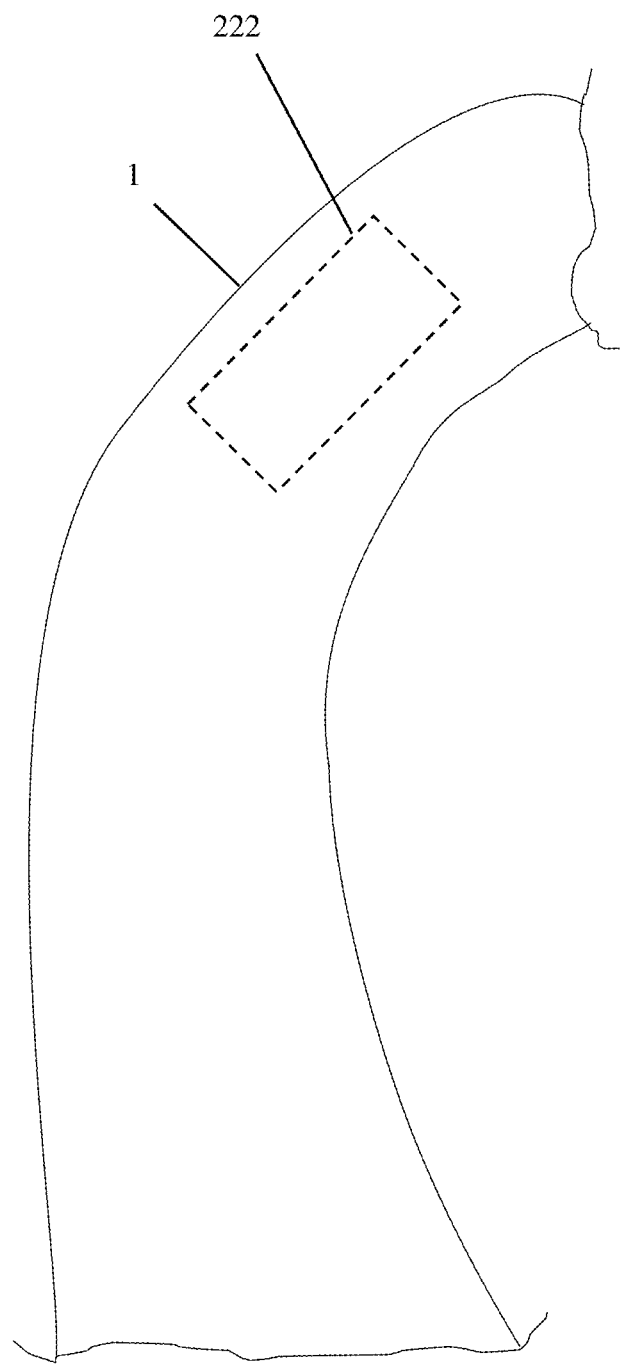
FIG. 8 is a side view of a portion of a thrust arm with a ramjet inside it according to the embodiment of FIG. 7.

FIGS. 7 and 8 show an alternative embodiment of an aircraft. In this embodiment, the aircraft 100 may be a watercraft that utilizes a jet engine 122 and four ducts that define four thrust arms 1 to provide the lift. In particular, the aircraft 100 comprises a fuselage 112, which includes a cockpit 3. The cockpit 3 may include a cabin for accommodating two persons. The jet engine 122 is installed upside down in an engine compartment 2. Thus, the jet engine 122 is essentially installed in anti-propulsion configuration, which essentially tricks the jet engine 122 into giving positive upward thrust and at same time providing four ports or point balance. The four thrust arms 1 can redirect the thrust to provide lift. Ramjets 222 may be provided inside their respective thrust arms 1 at the exit or outlet ports 136 for use in high speed flight.

The thrust arms 1 are designed to give roll cage effect. The thrust arms 1 are also heated by the engine 122 to keep ice from forming. Each thrust arm 1 curves upwardly and radially outwardly from the engine compartment 2 and then curves downwardly. The thrust arms 1 are spaced circumferentially around a vertical axis 102 that extends through the center of the engine compartment 2. Enclosed structural walls of the engine compartment 2 define the center of the roll cage. The aircraft 100 includes a bottom air intake chamber 5 that gives an extra 3' of crash resistance or crumple zone to help protect occupants and the engine. The top of the air intake chamber 5 may also be configured to be an occupant walking platform 4 that may be used for fishing, hunting, or rescue mission work. The shape of air intake chamber 5 allows the aircraft 100 to land on water or land.

Many different engines can be used to get close to same outcome. Also, more than four ports may be provided to push air therefore to provide the lift to the watercraft. Four or six or eight engines may be spaced out in circular or rectangular pattern to provide the lift and steering of the watercraft.

Although various embodiments of the disclosed aircraft have been shown and described, modifications may occur to those skilled in the art upon reading the specification. The present application includes such modifications and is limited only by the scope of the claims.

What is claimed is:

1. An aircraft comprising:
   an engine compartment;
   an air intake chamber;
      wherein the air intake chamber is located at a bottom of the aircraft;
      wherein the air intake chamber has an upwardly facing intake which draws air downwardly into the chamber;
   an engine provided in the engine compartment in a vertical, upside down orientation;
      wherein the engine receives air from the intake chamber; and
   a plurality of ducts;
      wherein each of the ducts defines a thrust arm positioned above the engine,
      wherein each of the thrust arms extends radially outwardly from the engine compartment, and
      wherein each of the thrust arms has an outlet port,
         wherein each of the outlet ports faces downwardly and is configured to direct air downwardly to provide thrust for the aircraft; and
      wherein the engine is operative to cause air to flow through the thrust arms and out the outlet ports.

2. The aircraft of claim 1, wherein the engine comprises a jet engine.

3. The aircraft of claim 2 further comprising:
   ramjets;
   wherein each of the ramjets is provided inside a respective thrust arm.

4. The aircraft of claim 1, wherein each of the thrust arms is funnel shaped and tapers in the downstream direction.

5. The aircraft of claim 1, wherein each of the thrust arms is arcuate, and
   wherein each of the thrust arms curves downwardly as it extends radially outwardly.

6. The aircraft of claim 5, wherein each of the thrust arms is funnel shaped and tapers in the downstream direction.

7. The aircraft of claim 1, wherein the air intake chamber comprises a crumple zone.

8. An aircraft comprising:
   an engine compartment;
   a jet engine provided in the engine compartment;
      wherein the jet engine is installed vertically in an upside down orientation;
   an air intake chamber;
      wherein the air intake chamber has an upwardly facing intake which draws air downwardly into the chamber, and
      wherein the engine receives air from the intake chamber;
   a plurality of ducts;
      wherein each of the ducts defines a thrust arm positioned above the jet engine,
      wherein each of the thrust arms extends radially outwardly from the engine compartment,
      wherein each thrust arm has an outlet port, wherein each of the outlet ports faces downwardly and is configured to direct air downwardly to provide thrust for the aircraft, and wherein the jet engine is operative to cause air to flow through the thrust arms and out the outlet ports; and ramjets;

wherein each of the ramjets is provided inside a respective thrust arm.

9. The aircraft of claim 8, wherein each of the thrust arms is arcuate, and wherein each of the thrust arms curves downwardly as it extends radially outwardly.

10. The aircraft of claim 9, wherein each of the thrust arms is funnel shaped and tapers in the downstream direction.

11. The aircraft of claim 8, wherein each of the thrust arms is funnel shaped and tapers in a downstream direction.

12. The aircraft of claim 8 wherein the air intake chamber is located at a bottom of the aircraft.

13. An aircraft comprising:

an engine compartment;

an engine provided in the engine compartment in a vertical, upside down orientation;

a plurality of ducts;

wherein each of the ducts defines a thrust arm, wherein each thrust arm has an outlet port, wherein each outlet port faces downwardly and is configured to direct air downwardly to provide thrust for the aircraft, and wherein the engine is operative to cause air to flow through the thrust arms and out the outlet ports; and an air intake chamber;

wherein the air intake chamber comprises a crumple zone, wherein the air intake chamber is located at the bottom of the aircraft, wherein the air intake chamber has an upwardly facing intake which draws air downwardly into the chamber, and wherein the engine receives air from the intake chamber.

14. The aircraft of claim 13 further comprising:

ramjets;

wherein each of the ramjets is provided inside a respective thrust arm.

15. The aircraft of claim 13, wherein each of the thrust arms is arcuate, and wherein each of the thrust arms curves downwardly as it extends radially outwardly.

16. The aircraft of claim 13, wherein the engine comprises a jet engine.

* * * * *